3,058,966
Patented Oct. 16, 1962

3,058,966
POLYMERS OF HALOGENATED ALICYCLIC AND STRAIGHT CHAIN MONOMERS
Charles W. Seelbach, Cranford, and Delmer L. Cottle, Highland Park, N.J., assignors to Esso Research and Engineering Company, a corporation of Delaware
No Drawing. Filed June 29, 1959, Ser. No. 823,353
3 Claims. (Cl. 260—91.5)

This invention relates to low pressure polymers of halogenated olefin monomers. More particularly it relates to polymers of this nature of halogenated alicyclic and straight chain olefins.

This application is a continuation-in-part of Serial No. 738,971, filed June 2, 1958.

The low pressure polymerization and copolymerization of alpha olefins and diolefins with catalyst systems made up of a partially reduced, heavy, transition metal compound and a reducing metal-containing compound to high density, often isotactic, high molecular weight, solid, relatively linear products has been assuming ever increasing importance and is well known. Recently it had been learned that chlorinating the polymers obtained gave rise to interesting new products.

It has now been found that polymers are obtained by the direct polymerization of chlorinated alicyclic and straight chain olefin monomers. The polymer products are usable in flame resistant plastics, elastomers and greases.

The halogenated monomers employed are alicyclic and straight chain olefins selected from the group consisting of 3,4-dichloro-1-butene and 1-chloro-1-cyclohexene. It is surprising that 1 chloro-1-cyclohexene is polymerized since it is not an alpha olefin. As regards 3,4-dichloro-1-butene it is significant that the related vinyl chloride is not similarly polymerized.

These polymer products have intrincic viscosities in xylene of 0.3 to 8 and melting points of from near room temperature to 300° C.

For the purpose of convenience details of the low pressure catalytic process are presented below, although it should be realized that these constitute no part of this invention.

The process is described in the literature, e.g., see Belgian Patent 538,782, and "Scientific American," September 1957, pages 98 et seq.

In the process the polymers are prepared by polymerizing the constituent monomers in the desired proportions with the aid of certain polymerization catalysts. The catalysts are reaction products obtained by partially reducing a reducible, heavy, transition halide of a group IV–B to VI–B or VIII metal, etc., with a reducing group I to III metal-containing material such as an organometallic compound of an alkali, alkaline earth, rare earth metal or zinc. They can also advantageously and preferably be prepared by reducing an appropriate metal compound with the aid of metallic aluminum or mixture of aluminum and titanium, etc., to obtain a crystalline catalyst, followed by activation with an aluminum alkyl.

A catalyst can thus be prepared by reducing 1 mole of titanium tetrahalide, usually tetrachloride, to the corresponding trivalent or sub-trivalent titanium halide with about 0.2 to 6 moles of aluminum triethyl, triisobutyl or other aluminum alkyl compound of the formula RR′AlX. In this formula, R, R′ and X preferably are alkyl groups of 2 to 8 carbon atoms, although X may alternatively be hydrogen or a halogen, notably chlorine. The reduction is carried out by dissolving each of the two catalyst components in an inert solvent, preferably a $C_3$ to $C_{18}$ paraffin such as isopentane or n-heptane, and mixing the two solutions in the proper proportions at temperatures between 0° and 150° C. and in the absence of moisture, oxygen and sulfur impurities. The resulting precipitate in conjunction with some free aluminum alkyl compound is generally considered to constitute the actual active polymerization catalyst. Alternatively, it is possible to carry out the catalyst preparation using only about 0.3 to 0.8 moles of the aluminum alkyl compound per mole of titanium chloride, and then adding a supplemental amount of the aluminum alkyl compound to the polymerization zone to raise the Al/Ti mole ratio therein to a value between about 1:1 and 3:1.

The monomer is then contacted with the resulting catalyst in the presence of the same or differing inert hydrocarbon solvents such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5 wt. percent based on total liquid and the polymer product concentration in the polymerization zone is preferably kept between about 2 to 15% based on total contents so as to allow easy handling of the polymerized mixture. The proper polymer concentration can be obtained by having enough of the inert diluent present or by stopping the polymerization short of 100% conversion. When the desired degree of polymerization has been reached, a lower, i.e., $C_1$ to $C_8$ alkanol such as methyl alcohol or isopropyl alcohol is normally added to the reaction mixture for the purpose of partially dissolving and deactivating the catalyst and for precipitating the polymer product from solution. A chelating compound can be used for further deashing. After filtration, the solid polymer may be further washed with alcohol or acid such as hydrochloric acid, dried, compacted and packaged.

It is to be understood that the term "low pressure" polymer as used herein connotes material prepared in the indicated manner.

This invention and its advantages will be better understood by reference to the following examples.

*Example 1.—Preparation of 3,4-Dichloro-1-Butene*

Butadiene (4.2 mole in ethyl chloride) was treated with 2.1 mole of chlorine at −10° to +5° C. The product was washed with trisodium phosphate solution, dried over potassium carbonate and distilled through a 30 inch helices-packed column at a reflux ratio of 40/1. This portion distilling up to 72° C., 95% of which distilled at 39–44° C., was the product and had a $n_D{}^{20}$ of 1.4662 (Chem. Abs. 40, 6406 (1946); J. Gen. Chem. (U.S.S.R.) 15, 981–7 (1945).

*Example 2.—Preparation of 1-Chloro-1-Cyclohexene*

This product was prepared from 1,2-dichlorocyclohexane by dehydrochlorination. It was the same product reported in Chem. Abs. 5, 1907 (1911); Ber. 44, 668–76.

*Example 3.—Polymer of 3,4-Dichloro-1-Butene*

The following catalyst mixture was charged to a 300 ml. steel microbomb in a dry nitrogen atmosphere:

(a) 0.3 gm. of $TiCl_3$ (preformed violet form containing about 15% titanium powder)
(b) 2 ml. of 0.88 molar $Al(Et)_3$ solution in heptane
(c) 2 ml. of 0.88 molar $Al(Et)_2Cl$ solution in heptane A one liter gas holder was evacuated and 15 ml. of 3,4-dichloro-1-butente was transferred to the gas holder in a nitrogen atmosphere and was rinsed in with 100 ml. of dry n-heptane. This solution was transferred to a feed reservoir bomb and then was pressured into the reactor bomb with 400 p.s.i.g. of nitrogen pressure.

The temperature was raised to 82° C. and was maintained for 40 hours. The pressure increased to 480 p.s.i.g. Upon cooling and opening the bomb a black solid was noted. The reaction mixture was transferred to a beaker containing 200 ml. of isopropanol. The solid was filtered off, deashed by heating with 200 ml. of isopropanol containing 5% acetylacetone, refiltered and dried in vacuo. A brown powder (2 grams) was obtained. The filtrate was evaporated on the steam bath and the residue dried in vacuo. A black grease (1.5 grams) was obtained. The brown solid had a molecular weight (Harris) of 8200 and a chlorine content of 32.9%. The black grease had a molecular weight of 2900.

*Example 4.—Polymers of 1-Chloro-1-Cyclohexene*

The following catalyst components were placed in a 300 ml. steel microbomb in a dry nitrogen atmosphere:

(a) 1.0 grams TiCl$_3$ (violet form containing about 15% titanium)
(b) 100 ml. of dry n-heptane
(c) 14.4 ml. of 0.88 molar AlEt$_3$ solution in n-heptane 1-chloro-1-cyclohexene (45.7 grams) was added and the bomb sealed in the dry nitrogen atmosphere. The bomb was placed in a rocker, pressured to 400 p.s.i.g. with nitrogen and heated to 80° C. for 90 hours.

The cooled bomb was opened and the contents poured into 10 ml. of isopropanol. A small amount of the polymer was insoluble in the reaction medium and some additional polymer was precipitated by the alcohol. The solid polymer was filtered off, deashed by heating to boiling with 500 ml. of isopropanol containing 1% acetylacetone and dried in vacuo to a brown powder. The filtrate from the reaction mixture in isopropanol was evaporated on a steam bath and was finally dried in vacuo to a tacky, black solid. The yield of brown powder was 9.2 grams and of the tacky solid was 18.9 grams for a total of 28.1 grams of polymer. The brown powder had a molecular weight (Harris) of 3000 and a chlorine content of 11.5%. The tacky solid had a molecular weight of 1000 and a chlorine content of 1.5%.

The powder is preferred for the fabrication of molded articles and the tacky product for greases or grease components, rubber additive agents, thickeners, etc.

*Example 5.—Polymer of 1-Chloro-1-Cylohexene*

The same general procedure was followed as in Example 4. The catalyst was as follows:

(a) 7 ml. of 0.88 molar TiCl$_4$ in dry n-heptane
(b) 100 ml. of dry n-heptane
(c) 14 ml. of 0.88 molar AlEt$_3$ in dry n-heptane.

The monomer was 39 grams of 1-chloro-1-cyclohexene. The polymer yield was 5.8 grams of brown powder and 15.2 grams of tacky-black solid for a total polymer yield of 21.0 grams. The brown powder had a molecular weight (Harris) of 2,800 and a Cl content of 12.5%. The tacky solid had a molecular weight of 1,000 and a Cl content of 2.3%.

The advantages of this invention will be apparent to those skilled in the art. Polymers of halogenated olefins are prepared directly without the requirement for a separate halogenation step. New products of attractive and especially less flammable properties are made available.

It is to be understood that this invention is not limited to the specific examples which have been offered merely as illustrations and that modifications may be made without departing from the spirit of the invention.

What is claimed is:

1. Homopolymers of chlorinated alicyclic and straight chain olefins selected from the group consisting of 3,4-dichloro-1-butene and 1-chloro-1-cyclohexene, the polymers having a molecular weight of from 1,000 to 3,000.

2. Homopolymer of claim 1 in which the olefin is 3,4-dichloro-1-butene.

3. Homopolymer of claim 1 in which the olefin is 1-chloro-1-cyclohexene.

References Cited in the file of this patent

UNITED STATES PATENTS 2,910,461    Nowling et al.            Oct. 27, 1959

FOREIGN PATENTS 661,806    Great Britain            Nov. 28, 1951

OTHER REFERENCES

Croxall et al., J.A.C.S., 76, page 1700 (1954).
Damnin et al., Zhur Obshchei Khim 24, pages 1017–19 (1954).